United States Patent
Cho et al.

(10) Patent No.: US 11,508,067 B2
(45) Date of Patent: Nov. 22, 2022

(54) METHOD FOR QUANTIFYING ALGAL FOR MANAGEMENT OF WATER QUALITY

(71) Applicant: SI Analytics Co., Ltd, Daejeon (KR)

(72) Inventors: Kyung Hwa Cho, Ulsan (KR); Jong Cheol Pyo, Ulsan (KR); Taegyun Jeon, Daejeon (KR)

(73) Assignee: SI Analytics Co., Ltd, Daejeon (KR)

( * ) Notice: Subject to any disclaimer, the term of this patent is extended or adjusted under 35 U.S.C. 154(b) by 0 days.

(21) Appl. No.: 17/512,536

(22) Filed: Oct. 27, 2021

(65) Prior Publication Data

US 2022/0138942 A1    May 5, 2022

(30) Foreign Application Priority Data

Oct. 29, 2020 (KR) .................. 10-2020-0141901
Jun. 7, 2021 (KR) .................. 10-2021-0073686

(51) Int. Cl.
*G06T 7/00* (2017.01)
*G06T 3/40* (2006.01)
*G06N 3/08* (2006.01)

(52) U.S. Cl.
CPC .......... *G06T 7/0012* (2013.01); *G06N 3/082* (2013.01); *G06T 3/4046* (2013.01); *G06T 2207/10036* (2013.01); *G06T 2207/20081* (2013.01); *G06T 2207/20084* (2013.01)

(58) Field of Classification Search
CPC ............... G06T 7/0012; G06T 3/4046; G06T 2207/10036; G06T 2207/20081; G06T 2207/20084; G06N 3/082
See application file for complete search history.

(56) References Cited

U.S. PATENT DOCUMENTS

| | | | |
|---|---|---|---|
| 10,725,438 B1* | 7/2020 | Marsousi | G06N 3/082 |
| 11,244,461 B2* | 2/2022 | Jung | G06T 17/05 |
| 2020/0096434 A1* | 3/2020 | Deran | G01N 15/147 |
| 2020/0134392 A1* | 4/2020 | Gui | A01B 79/005 |
| 2022/0038644 A1* | 2/2022 | McAllister | G01J 3/2823 |
| 2022/0067930 A1* | 3/2022 | Robitaille | A01K 61/90 |

FOREIGN PATENT DOCUMENTS

| | | |
|---|---|---|
| KR | 10-2011-0113348 A | 10/2011 |
| KR | 10-1462127 B1 | 11/2014 |
| KR | 10-1535624 B1 | 7/2015 |
| KR | 10-2017-0108790 A | 9/2017 |
| KR | 10-2017-0112404 A | 10/2017 |
| KR | 10-2018-0000325 A | 1/2018 |
| KR | 10-2018-0051729 A | 5/2018 |
| KR | 10-1936586 B1 | 4/2019 |
| KR | 10-2169529 B1 | 10/2020 |

OTHER PUBLICATIONS

J. Pyo et al., "A convolutional neural network regression for quantifying cyanobacteria using hyperspectral imagery," Remote Sensing of Environment, 2019, 11 pages.

\* cited by examiner

Primary Examiner — Ping Y Hsieh
(74) Attorney, Agent, or Firm — Seed IP Law Group LLP

(57) ABSTRACT

Disclosed is a method for quantifying algal for management of water quality, performed by a computing device. The method may include: receiving a remote sensing image of an object of interest; and predicting a water quality variable based on the remote sensing image using a pre-trained algal estimation model.

20 Claims, 6 Drawing Sheets

METHOD FOR QUANTIFYING ALGAL FOR MANAGEMENT OF WATER QUALITY

CROSS-REFERENCE TO RELATED APPLICATIONS

This application claims priority to and the benefit of Korean Patent Application No. 10-2020-0141901 filed in the Korean Intellectual Property Office on Oct. 29, 2020, and Application No. 10-2021-0073686 filed in the Korean Intellectual Property Office on Jun. 7, 2021, the entire contents of which are incorporated herein by reference.

TECHNICAL FIELD

The present disclosure relates to an image processing technique, and more particularly, to a method for quantifying algal by using a neural network for management of water quality.

DESCRIPTION OF THE RELATED ART

The World Health Organization (WHO) reported on contents regarding harmful algal that affects water quality and public health deterioration. In accordance with the report by the World Health Organization, attempts to manage water quality through observations of the harmful algal are steadily continued.

Water quality observations using remote sensors are effective in monitoring the harmful algal. In particular, hyperspectral airline remote sensing is suitable for accurately monitoring the harmful algal with high spatial and spectral resolution. As a result, various techniques have been developed by processing multi-spectral and hyperspectral images generated through satellite shooting, and monitoring the harmful algal.

Korean Patent Unexamined Publication No. 2017-0108790 discloses Convergence Floating Type Water Management System.

BRIEF SUMMARY

The inventors of the present disclosure have appreciated that the conventional methods in the related art are difficult to achieve optimal observations and accurate analysis due to biophysical complexity and seasonal impacts of regional optical properties of freshwater. The present disclosure is contrived in response to various technical problems shown in the background art as well as the problems identified by the inventors. In one or more embodiments of the present disclosure, the inventors have provided a method for quantifying a distribution and a concentration of algal based on a hyperspectral image. As such, one or more embodiments may improve the accuracy of monitoring the distribution and concentration of the harmful algal present in the freshwater. This is only one technical benefit of the embodiments and a person of ordinary skill in the art would readily appreciate the various technical benefits achieved based on the features described in the embodiments of the present disclosure.

An embodiment of the present disclosure provides a method for quantifying algal for management of water quality, performed by a computing device. The method may include: receiving a remote sensing image of an object of interest; and predicting a water quality determination factor based on the remote sensing image using a pre-trained algal estimation model.

In an alternative embodiment, the remote sensing image may include a hyperspectral image of the object of interest.

In an alternative embodiment, the remote sensing image may include atmospheric correction information including at least one of total flux of the object of interest, diffuse transmittance of the object of interest, direct transmittance of the object of interest, spherical albedo of the object of interest, or path radiance of the object of interest; and raw information representing a digital number of the remote sensing image.

In an alternative embodiment, the algal estimation model may include: a first layer including a convolutional layer receiving at least a portion of the remote sensing image; a second layer including a convolutional layer receiving an output of the first layer and a pooling layer; and a third layer including at least one fully connected layer receiving an output of the second layer.

In an alternative embodiment, the algal estimation model may further include: a first sub-layer for adjusting a scale gradient of at least one of the first layer or the second layer; and a second sub-layer for preventing overfitting of the algal estimation model by randomly dropping out some nodes of the second layer.

In an alternative embodiment, the method may further include generating at least one input window having a predetermined size (or a selected size) from the remote sensing image.

In an alternative embodiment, the predetermined size (or a selected size) of the input window may be determined based on at least one of spatial information of the object of interest, a non-linear feature of a distribution of the water quality variable, or a linear feature of a concentration.

In an alternative embodiment, a center point of the input window may be a monitoring point selected for observation of the object of interest.

In an alternative embodiment, the algal estimation model may learn a spatial and spectral feature of the input window through a convolutional layer.

In an alternative embodiment, the water quality variable may include at least one of phycocyanin that is one of compounds contained in the algal; or chlorophyll-a.

In an alternative embodiment, the method may further include generating a pigment map indicating a distribution and a concentration of the algal based on the water quality variable.

Another embodiment of the present disclosure provides a computer program stored in a computer-readable storage medium. The computer program, when executed on one or more processors, causes the following operations to be performed for quantifying algal for management of water quality, the operations may include: receiving a remote sensing image of an object of interest; generating at least one input window having a predetermined size (or a selected size) from the remote sensing image; and predicting at least one water quality variable based on at least one input window of the remote sensing image, using a pre-trained algal estimation model; and predicting at least one water quality variable based on the remote sensing image using a pre-trained algal estimation model.

Still another embodiment of the present disclosure provides a device for quantifying algal for management of water quality. The device may include: a processor including at least one core; a memory including program codes executable in the processor; and a network unit for receiving a remote sensing image of an object of interest, and the processor may be configured to generate at least one input window having a predetermined size (or a selected size)

from the remote sensing image; and predict at least one water quality variable based on at least one input window of the remote sensing image, using a pre-trained algal estimation model.

According to an embodiment of the present disclosure, a method for quantifying a distribution and a concentration of algal based on a hyperspectral image can be provided.

The above mentioned embodiments are not a summary of the embodiments and further detail of the embodiments will be explained below in connection with the various drawings.

DETAILED DESCRIPTION

Figure 1:
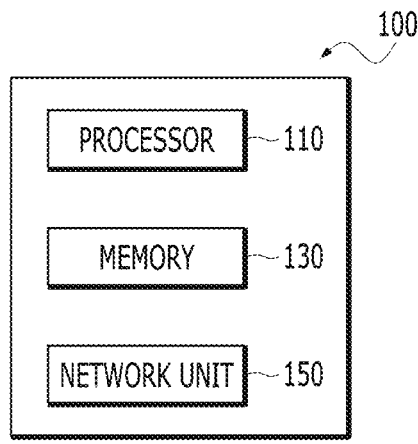
FIG. 1 is a block diagram of a computing device according to an embodiment of the present disclosure.

Various embodiments will now be described with reference to drawings. In the present specification, various descriptions are presented to provide appreciation of the present disclosure. However, it is apparent that the embodiments can be executed without the specific description.

"Component," "module," "system," and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or." That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A," "a case including only B," and "a case in which A and B are combined."

Those skilled in the art would be able to readily appreciate that various illustrative logical blocks, configurations, modules, circuits, means, logic, and algorithm steps described in connection with the embodiments disclosed herein may be additionally implemented as electronic hardware, computer software, or combinations of both sides. To clearly illustrate the interchangeability of hardware and software, various illustrative components, blocks, constitutions, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented embodiments is provided so that those skilled in the art of the present disclosure use or implement the present disclosure. Various modifications to the embodiments will be apparent to those skilled in the art. Generic principles defined herein may be applied to other embodiments without departing from the scope of the present disclosure. Therefore, the present disclosure is not limited to the embodiments presented herein. The present disclosure should be analyzed within the widest range which is coherent with the principles and new features presented herein.

In the present disclosure, a network function and an artificial neural network and a neural network may be interchangeably used.

The term "image" or "video" used throughout the detailed description and claims of the present disclosure refers to multi-dimensional data constituted by discrete image elements (e.g., pixels in a 2D image), and in other words, refers to an object which may be seen with an eye (e.g., displayed on a video screen) or a digital representation of the object (such as a file corresponding to an output of a hyperspectral sensor, etc.). For example, the "image" or "video" is a satellite shooting system, an aircraft photographing system, or a video of an overhead view of an overhead of an arbitrary photographing system known in the art of the present disclosure.

FIG. 1 is a block diagram of a computing device according to an embodiment of the present disclosure.

A configuration of the computing device 100 illustrated in FIG. 1 is only an example shown through simplification. In an embodiment of the present disclosure, the computing device 100 may include other components for performing a computing environment of the computing device 100 and only some of the disclosed components may constitute the computing device 100.

The computing device 100 may include a processor 110, a memory 130, and a network circuit 150 (or herein after referred to as "a network unit 150").

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an embodiment of the present disclosure. According to an embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an embodiment of the present disclosure, processors of a plurality of computing devices may be used together to process the learning of the network function and the data classification using the network function. Further, the computer program executed in the computing device according to an embodiment of the present disclosure may be a CPU, GPGPU, or TPU executable program.

The processor 110 may predict at least one water quality determination factor using an algal estimation model based on a remote sensing image for the object of interest. In this case, the object of interest may be freshwater in land such as river, streams, etc. For example, the processor 110 may estimate a distribution, a concentration, etc., of the water quality determination factor capable of quantifying harmful algal present in the freshwater using the algal estimation model which is a pre-trained neural network model. The harmful algal may include algal which affects deterioration of water quality such as cyanobacteria. The processor 110 may estimate the distribution, the concentration, etc., of a compound constituting the cyanobacteria by inputting the remote sensing image for the freshwater into the algal estimation model for an entire freshwater area included in the remote sensing image.

The processor 110 may generate a map indicating information on the water quality determination factor in order to visualize the prediction result. The processor 110 may generate a pigment map indicating a distribution and a concentration of water quality determination factors based on a prediction result value of the algal estimation model. For example, the processor 110 may generate a pigment map for the entire freshwater area included in the remote sensing image based on information on the compound constituting the cyanobacteria output from the algal estimation model. The processor 110 may generate an image expressing quantitative characteristics regarding the concentration of the compound constituting the cyanobacteria based on the freshwater area in the remote sensing image. The compound constituting the cyanobacteria may include at least one of phycocyanin, chlorophyll-a, etc.

According to an embodiment of the present disclosure, the memory 130 may store any type of information generated or determined by the processor 110 and any type of information received by the network unit 150.

According to an embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to an embodiment of the present disclosure may use an arbitrary type wired/wireless communication systems.

The techniques described in this specification may also be used in other networks in addition to the aforementioned networks.

The network unit 150 may receive a remote sensing image for an object of interest from a satellite or airline image photographing system. For example, the remote sensing image for object of interest such as the fresh water in land may be data for learning data or inference data for an algal estimation model which is a neural network model. The remote sensing image for the object of interest may be a hyperspectral image photographed based on an overhead view of the object of interest. The remote sensing image is not limited to the above-described example, and may include all images related to the object of interest acquired through the satellite or airline photographing such as a multi-spectral image.

Figure 2:
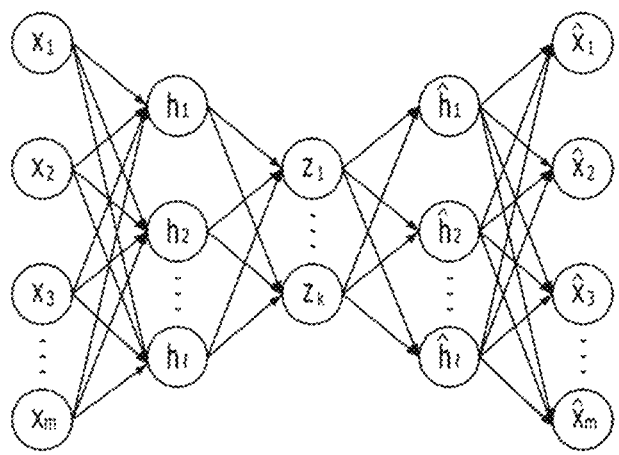
FIG. 2 is a schematic view illustrating a network function according to an embodiment of the present disclosure.

FIG. 2 is a schematic view illustrating a network function according to an embodiment of the present disclosure.

Throughout the present disclosure, a computation model, the neural network, a network function, and the neural network may be used as an interchangeable meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another embodiment of the present disclosure, the number of nodes of the input layer may be larger than the number of nodes of the output layer, and the neural network may be a neural network of a type in which the number of nodes increases from the input layer to the hidden layer. The neural network according to still yet another embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to reduce or minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (e.g., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (e.g., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (e.g., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

Figure 3:
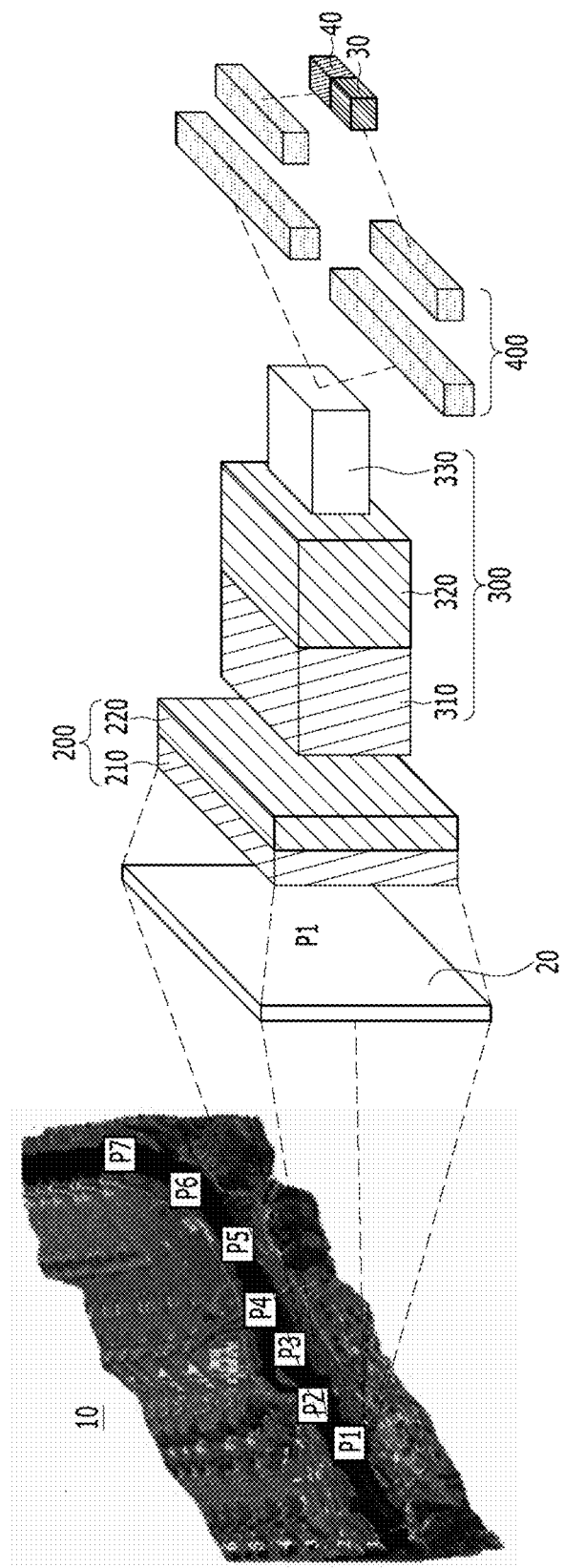
FIG. 3 is a schematic view illustrating a structure of an algal estimation model according to an embodiment of the present disclosure.

FIG. 3 is a schematic view illustrating a structure of an algal estimation model according to an embodiment of the present disclosure.

A remote sensing image 10 which is input data of the algal estimation model according to an embodiment of the present disclosure may include a hyperspectral image for an object of interest. In this case, the remote sensing image 10 may include atmospheric correction information for considering atmospheric and radiation effects for algal estimation and raw information representing a digital number of the remote sensing image 10. For example, the atmospheric correction information may include at least one of total flux, diffuse transmittance, direct transmittance, spherical albedo, or path radiance of the object of interest.

Referring to FIG. 3, the remote sensing image 10 may be constituted by images included in a predetermined wavelength band in order to reflect a location of harmful algal (e.g., cyanobacteria) and seasonal variety. For example, the remote sensing image 10 may include 6 parameters matching each of 86 bands within a range of 400 to 800 nm to consider spectrum characteristics of all parameters including the atmospheric correction information and the raw information, That is, the remote sensing image 10 may be data having a spectrum depth of 86×6=516 based on 6 parameters (e.g., the total flux, the diffuse transmittance, the direct transmittance, the spherical albedo, the path radiance, and the digital number).

Referring to FIG. 3, the processor 110 may perform point sampling for the remote sensing image 10. The processor 110 may extract at least a part of the remote sensing image 10 according to a predetermined reference or based on a monitoring point randomly selected in order to observe an object of interest in the remote sensing image 10. In this case, the predetermined reference may be preset based on spatial information (e.g., a size, a width, etc., of the river) of the object of interest or a knowledge of a domain specialist. For example, in streams in which the width of the object of interest is small and a length is large, the processor 110 may set monitoring points expressed as P1 to P7 in the remote sensing image 10 along the streams. In addition, the processor 110 may generate input data of a model centering on each of the monitoring points expressed as P1 to P7. In this case, sizes of the input data may be set by considering variables related to the spatial information of the object of interest. The processor 110 may input input data 20 centering on P1 into the algal estimation model, and sequentially input input data centering the remaining monitoring point.

The algal estimation model may include a first layer 200 receiving an input window 20 of the remote sensing image 10 a second layer 300 connected to the first layer 200 and strengthening a feature extracted from the first layer 200, and a third layer 400 connected to the second layer 300 and predicting a water quality determination factor. For example, the first layer 200 may include a first convolutional layer 210 receiving the input window 20 of the remote sensing image 10 and deriving the feature. The second layer 300 may include a second convolutional layer 310 receiving an output of the first layer 200 and deriving a high-dimension feature for the input window 20 of the remote sensing image 10 and a pooling layer 330 strengthening the high-dimension feature extracted from the second convolutional layer 310. The third layer 400 may include at least one fully connected layer receiving the output of the second layer 300.

The convolutional layers 210 and 220 may extract or learn an internal feature of the input window 20 of the remote sensing image 10 by performing an inner product of an input vector, a learnable weight, and a deflection. For example, the first convolutional layer 210 may extract or learn a unique feature for the input window 20 of the remote sensing image 10 by receiving the input window 20 of the remote sensing image 10. The output of the first convolutional layer 210 may be supplied to the second convolutional layer 310. The second convolutional layer 310 may extract or learn a high-dimension feature for data output from a first convolution.

The pooling layer 330 may strengthen a unique feature of the input data by down sampling an operator according to a spatial dimension. For example, the pooling layer 330 is connected to a rear side of the second convolutional layer 310 to extract or learn the high-dimension feature derived by the second convolutional layer 310. The pooling layer 330 as a maximum pooling layer may extract the unique feature of the input value by selecting and down sampling a maximum value in a fixed area of the second convolutional layer 310.

The fully connected layer 400 may predict or learn concentrations 30 and 40 of the water quality variables by receiving the output of the pooling layer 330. For example, the fully connected layer 400 is divided into two layers to predict and output surface reflection or the concentration 30 of phycocyanin which is one of compounds constituting the cyanobacteria from one layer. Further, the fully connected layer 400 may predict and output surface reflection or the concentration 40 of chlorophyll a which is one of compounds constituting the cyanobacteria from one remaining layer.

Referring to FIG. 3, the algal estimation model may further include at least one first sub layer 220 or 320 for preventing early saturation of a non-linear activation function in the middle of training a neural network model, and a second sub layer for preventing effective normalization and overfitting of the neural network model. For example, one 220 of two first sub layers may be connected to the rear side of the first convolutional layer 210, and the other one 320 may be disposed between the second convolutional layer 310 and the pooling layer 330. Although not illustrated in FIG. 3, the second sub layer may be connected to the rear side of the pooling layer 330.

The first sub layers 220 and 320 may perform batch normalization in order to reduce internal covariance movement of an entire neural network of the algal estimation model. For example, two first sub layers 220 and 320 are connected to the first convolutional layer 210 and the second convolutional layer 310, respectively to reduce a scale gradient of the input values of the first layer 200 and the second layer 300, and a network parameter. Through this, a learning rate which is relatively high without a diffusion risk may be applied to the entire neural network of the algal estimation model.

The second sub layer may prevent overfitting of the entire neural network by randomly omitting an output node of a previous layer. During a training process, a node dropped by the second sub layer is temporarily removed in a forward network, and a weight and a deflection are not updated in a backward network. That is, the entire neural network is less sensitive to a unique weight and a unique deflection and is normalized by the second sub layer, and the neural network model may not be overfitted by a training data set.

Figure 4:
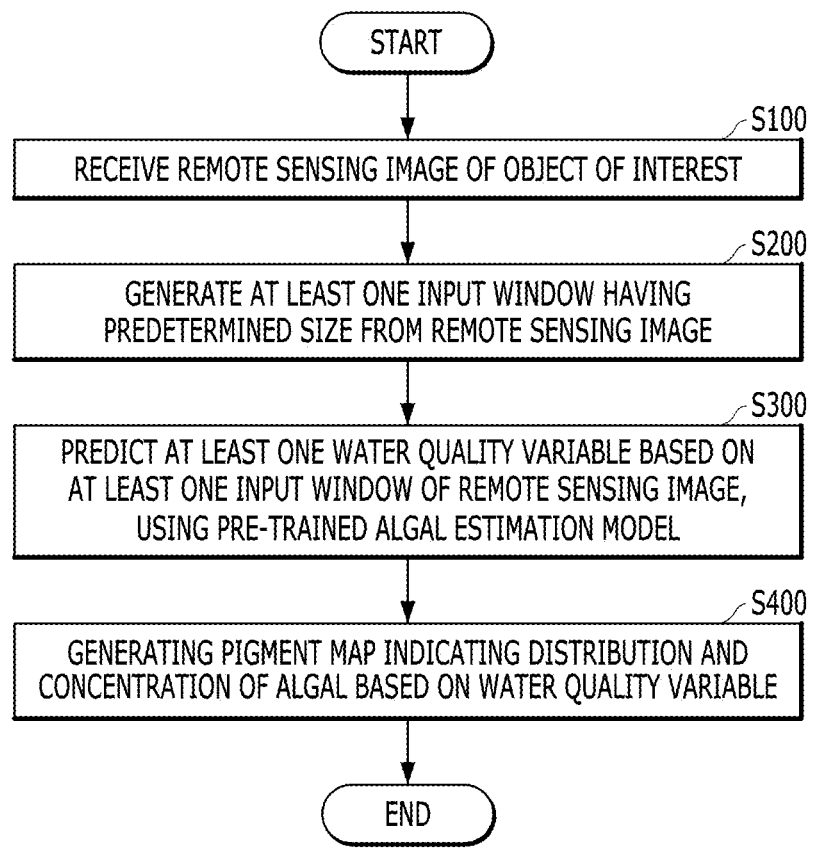
FIG. 4 is a flowchart illustrating a method for quantifying algal for management of water quality according to an embodiment of the present disclosure.

FIG. 4 is a flowchart illustrating a method for quantifying algal for management of water quality according to an embodiment of the present disclosure.

Referring to FIG. 4, in step S100, a computing device 100 may receive a remove sensing image for an object of interest from an external system. The object of interest as an object which becomes a target of management of water quality may include freshwater in land such as rivers, streams, etc. The remote sensing image as a satellite image or an airline image for the freshwater in land such as the rivers, the streams, etc., may be a hyperspectral image photographed by a hyperspectral sensor. The external system may also be a database storing the remote sensing image, and may be an image photographing system including satellite equipment or an airplane. A specific disclosure described above is just one example, and the present disclosure is not limited thereto.

In step S200, the computing device 100 may generate at least one input window having a predetermined size (or a selected size) from the remote sensing image. The input window as a part of the remote sensing image may be used as an input of the algal estimation model. In this case, a center of the input window may be a monitoring point of an object of interest set for observation of the object of interest. That is, the computing device 100 may select at least one monitoring point randomly or based on a predetermined reference on the remote sensing image. In addition, the computing device 100 may generate the input window which becomes the center of the monitoring point and use the generated input window as the input of the algal estimation model. For example, the computing device 100 may set a plurality of monitoring points on the hyperspectral image for the freshwater, and generate the input window centering each monitoring point.

Meanwhile, the predetermined size (or a selected size) of the input window may be determined based on at least one of spatial information of the object of interest, a non-linear feature of a distribution of the water quality variable, or a linear feature of a concentration. For example, the computing device 100 may determine the size of the input window by considering physical information such as a shape, a width, a size, etc., of the object of interest, and features related to a type, a distribution, and a concentration of the compound constituting the harmful algal. In the case of streams in which the width of the object of interest is small and the length is large, the computing device 100 may extract an input window having a relatively small size (e.g., 8×8, 6×6, 4×4, etc.) from the remote sensing image or each monitoring point. The size of the input window may also be determined based on the object of interest and the water quality variable in the computing device 100, and also determined according to a reference set in the computing device 100 through an external input applied from a user.

In step S300, the computing device 100 may predict the water quality variable based on at least one input window using a pre-trained algal estimation model. For example, the computing device 100 may perform a convolution operation by sequentially inputting input windows having a size of 8×8 into the pre-trained algal estimation model. During a convolution operation process, an internal filter may extract space and spectrum features of the input window by moving the input window. This may allow the algal estimation model to predict the water quality variable by considering all pixels surrounding the center point of the input window. The algal estimation model may regress the concentrations of phycocyanin and chlorophyll a which are one of the compounds contained in the cyanobacteria based on the convolution operation. The algal estimation model for the regression operation may include a first layer including a convolutional layer and a first sub layer for batch normalization, a second layer including the convolutional layer, the layer for the batch normalization, a maximum pooling layer, and a layer for drop out, and two sequentially fully connected layer for estimating phycocyanin and chlorophyll a.

In step S400, the computing device 100 may generate a pigment map indicating the distribution and the concentration of the water quality variable predicted through the pre-trained algal estimation model. For example, the computing device 100 may generate a pigment map acquired by outputting concentration information of phycocyanin and chlorophyll a for an entire area of the object of interest which is an output value of the pre-trained algal estimation model through a spectrum. The pigment map generated by the computing device 100 may be transmitted to a user terminal and provided to the user. The user may determine the concentration of the cyanobacteria distributed in specific freshwater which is the object of interest through the pigment map at a glance, and predict a water quality state of the specific freshwater.

Figure 5:
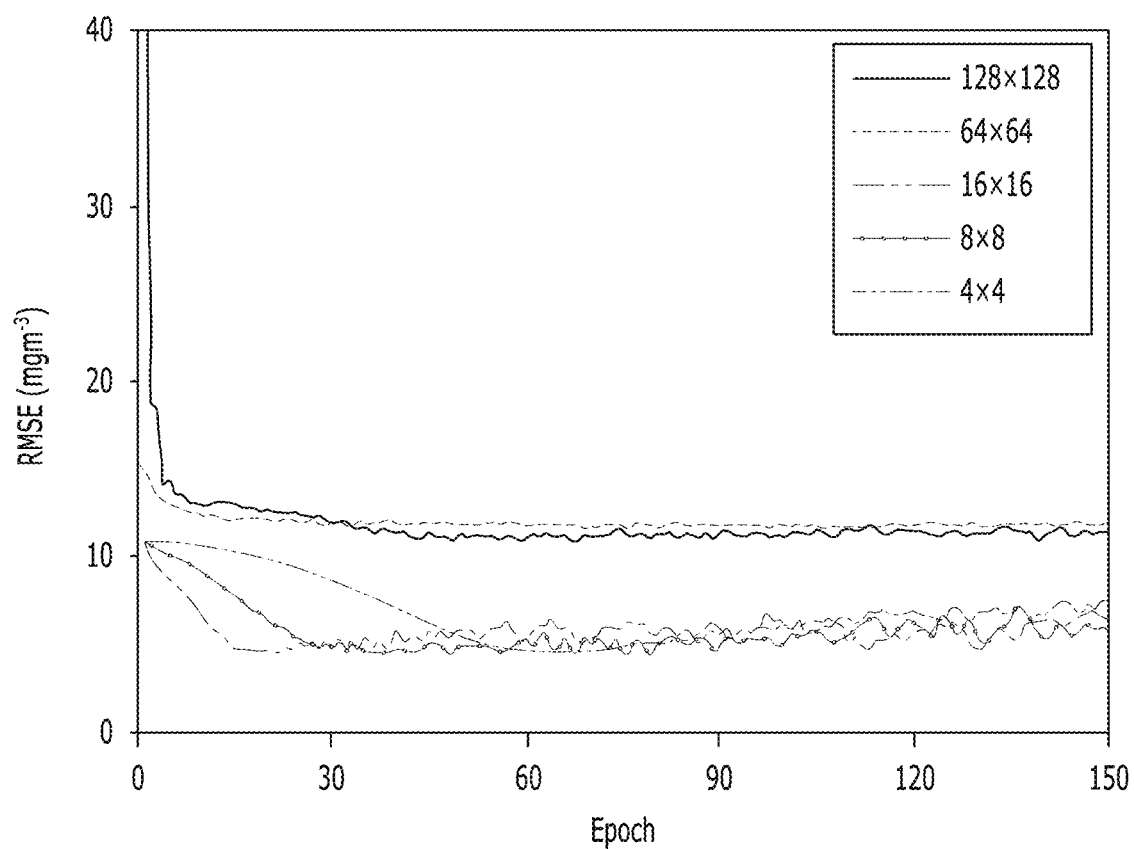
FIG. 5 is a graph showing a comparison of a size of an input window of an algal estimation model according to an embodiment of the present disclosure.

FIG. 5 is a graph showing a comparison of a size of an input window of an algal estimation model according to an embodiment of the present disclosure.

The size of the input window according to an embodiment of the present disclosure may be determined based on variables related to physical information of the object of interest so that the algal estimation model accurately predicts a spatial feature of the water quality variable. FIG. 5 shows a validation error result according to the size of the input window when the object of interest is a water body of weir.

Referring to FIG. 5, it can be confirmed that when the object of interest is the water body of the weir, if an input window having a large size such as 128×128 or 64×64 is used as the input of the algal estimation model, a larger validation error occurs than a case of using an input window having a small size such as 8×8, 6×6, or 4×4 as the input. When the size of the input window is 128×128, the concentrations of phycocyanin and chlorophyll a in the water body of the weir predicted by the algal estimation model show a significant mismatch with underestimation as compared with an actual distribution. When the size of the input window is 64×64, the case is slightly improved as compared with the case of 128×128, but the algal estimation model may not reproduce accurate spatial features of phycocyanin and chlorophyll a in the water body of the weir. Further, when the size of the input window is 64×64, it may be confirmed that concentration levels of phycocyanin and chlorophyll a are underestimated in the vicinity of an area where a maximum algal concentration is generated.

Referring to the result of FIG. 5, it can be seen that in the case of an object of interest having a structure in which the width is small and the length is large, such as the water body of the weir, using the input window having the relatively small size such as 8×8, 6×6, or 4×4 instead of using the input window having the large size such as 128×128 or 64×64 contributes performance enhancement of the algal estimation model. That is, the size of the input window according to an embodiment of the present disclosure may be determined on the computing device 100 by considering the physical information such as the length, the width, etc., of the object of interest. When the size of the input window of the algal estimation model is set by considering the object of interest as such, the computing device 100 may not lose heterogeneous information in the remote sensing image, but effectively extract the non-linear spatial feature of the water quality variable such as phycocyanin and chlorophyll a, and accurately predict the distribution and the concentration of the algal.

Figure 6:
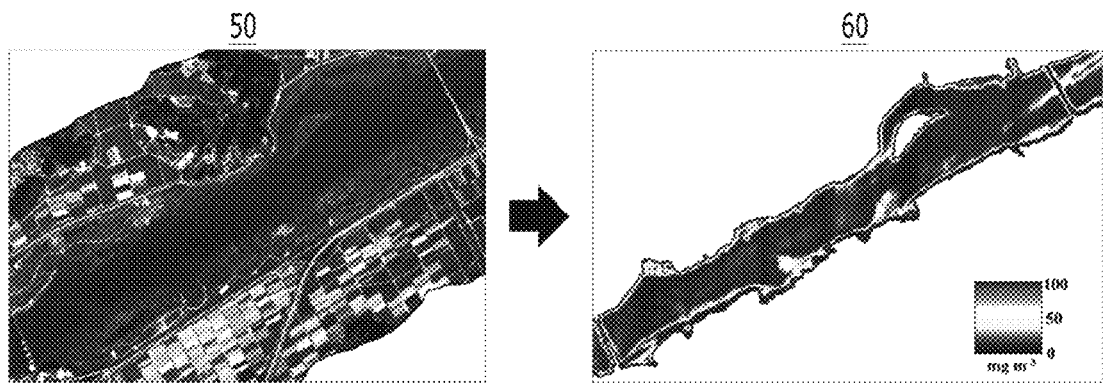
FIGS. 6 and 7 are schematic views illustrating a pigment map according to an embodiment of the present disclosure.
Figure 7:
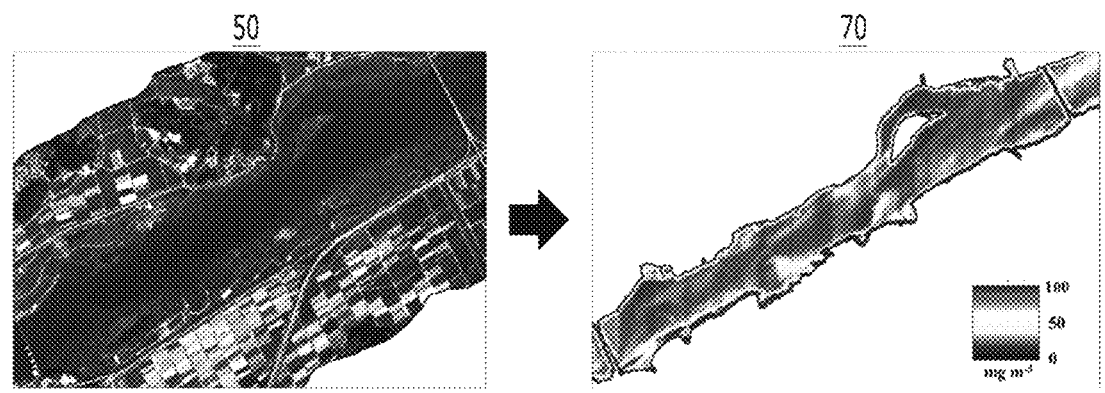

FIGS. 6 and 7 are schematic views illustrating a pigment map according to an embodiment of the present disclosure.

Referring to FIG. 6, the computing device 100 according to an embodiment of the present disclosure may generate a first pigment map 60 indicating the concentration of the phycocyanin for quantifying the cyanobacteria distributed in the object of interest such as the freshwater. In the first pigment map 60, the concentration of the phycocyanin is digitized to be distinguished and displayed for each color. When a left RGB image 50 and a right first pigment map 60 of FIG. 6 are compared with each other, it may be confirmed that the first pigment map 60 more visually accurately shows a spatial feature of a cyanobacteria bloom than the RGB image 50 through display of the concentration of the phycocyanin displayed through spectrum for each color.

Referring to FIG. 7, the computing device 100 according to an embodiment of the present disclosure may generate a second pigment map 70 indicating the concentration of the chlorophyll a for quantifying the cyanobacteria distributed in the object of interest such as the freshwater. In the same scheme as the first pigment map 60, in the second pigment map 70, the concentration of the chlorophyll a is digitized to be distinguished and displayed for each color. When the left RGB image 50 and the right second pigment map 70 of FIG. 7 are compared with each other, it may be confirmed that the second pigment map 70 more visually accurately shows a spatial feature of a cyanobacteria bloom than the RGB image 50 through display of the concentration of the chlorophyll a displayed through spectrum for each color. Arrows of FIGS. 6 and 7 are just figures displayed for the comparison between the RGB image 50 and the pigment maps 60 and 70, and do not mean that the pigment maps 60 and 70 are extracted from the RGB image 50.

Meanwhile, disclosed is a computer-readable medium storing a data structure according to an embodiment of the present disclosure.

The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an effectively designed data structure, a computing device can perform operations while using the resources of the computing device to a minimum. Specifically, the computing device can increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

Throughout the present specification, a computation model, the neural network, a network function, and the neural network may be used as the same meaning. Hereinafter, a computation model, the neural network, a network function, and the neural network will be integrally described. The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for learning the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for learning the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called nodes. The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include weights of the neural network (weights and parameters may be used as the same meaning in the present disclosure). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Figure 8:
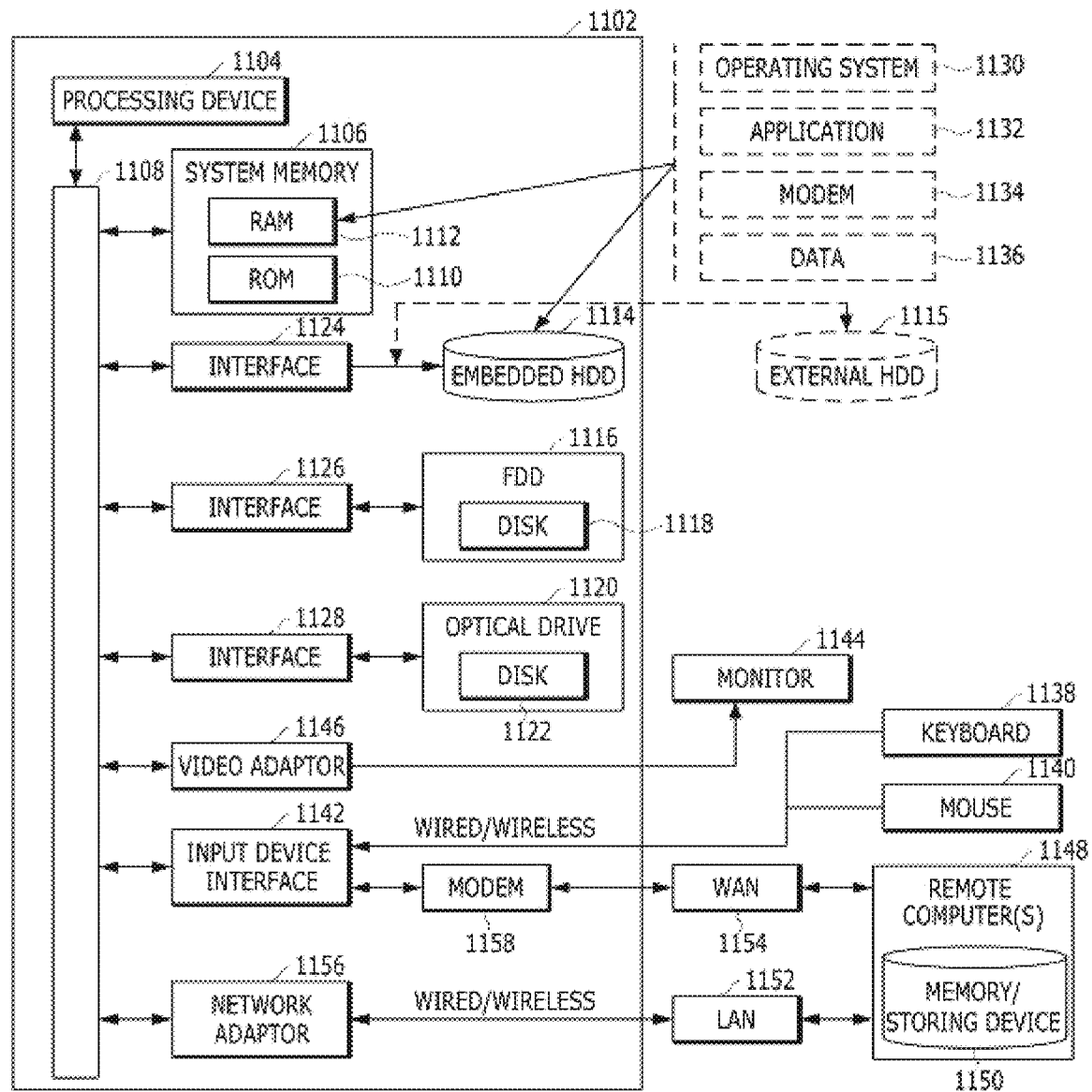
FIG. 8 is a block diagram of a computing device according to an embodiment of the present disclosure.

FIG. 8 is a simple and normal schematic view of a computing environment in which the embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical disk drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various logical blocks, modules, processors, means, circuits, and algorithm steps described in association with the embodiments disclosed herein may be implemented by electronic hardware, various types of programs or design codes (for easy description, herein, designated as software), or a combination of all of them. In order to clearly describe the intercompatibility of the hardware and the software, various components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be interpreted within the widest range which is coherent with the principles and new features presented herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for quantifying algal for management of water quality, performed by a computing device comprising at least one processor, comprising:
receiving a remote sensing image of an object of interest;
generating at least one input window having a selected size from the remote sensing image; and
predicting at least one water quality variable based on at least one input window of the remote sensing image, using a pre-trained algal estimation model.

2. The method of claim 1, wherein the remote sensing image includes:
a hyperspectral image of the object of interest.

3. The method of claim 2, wherein the remote sensing image includes:
atmospheric correction information including at least one of total flux of the object of interest, diffuse transmittance of the object of interest, direct transmittance of the object of interest, spherical albedo of the object of interest, or path radiance of the object of interest; and
raw information representing a digital number of the remote sensing image.

4. The method of claim 1, wherein the pre-trained algal estimation model includes:
a first layer including a convolutional layer receiving at least a portion of the remote sensing image;
a second layer including a convolutional layer receiving an output of the first layer and a pooling layer; and
a third layer including at least one fully connected layer receiving an output of the second layer.

5. The method of claim 4, wherein the pre-trained algal estimation model further includes:
a first sub-layer for adjusting a scale gradient of at least one of the first layer and the second layer; and
a second sub-layer for preventing overfitting of the pre-trained algal estimation model by randomly dropping out some nodes of the second layer.

6. The method of claim 1, wherein the selected size of the input window is determined based on at least one of spatial information of the object of interest, a non-linear feature of a distribution of the water quality variable, or a linear feature of a concentration.

7. The method of claim 6, wherein a center point of the input window is a monitoring point selected for observation of the object of interest.

8. The method of claim 1, wherein the pre-trained algal estimation model learns a spatial and spectral feature of the input window through a convolutional layer.

9. The method of claim 1, wherein the water quality variable includes at least one of the followings:
phycocyanin that is one of compounds contained in the algal; or
chlorophyll-a.

10. The method of claim 1, further comprising:
generating a pigment map indicating a distribution and a concentration of the algal based on the water quality variable.

11. A computer program stored in a non-transitory computer-readable storage medium, wherein the computer program, when executed on one or more processors, causes the following operations to be performed for quantifying algal for management of water quality, the operations comprising:
receiving a remote sensing image of an object of interest;
generating at least one input window having a selected size from the remote sensing image; and
predicting at least one water quality variable based on at least one input window of the remote sensing image, using a pre-trained algal estimation model.

12. A device for quantifying algal for management of water quality comprising:
a processor including at least one core;
a memory including program codes executable in the processor; and
a network unit for receiving a remote sensing image of an object of interest,
wherein the processor is configured to:
generate at least one input window having a selected size from the remote sensing image; and
predict at least one water quality variable based on at least one input window of the remote sensing image, using a pre-trained algal estimation model.

13. The device of claim 12, wherein the remote sensing image includes a hyperspectral image of the object of interest.

14. The device of claim 12, wherein the remote sensing image includes:
atmospheric correction information including at least one of total flux of the object of interest, diffuse transmittance of the object of interest, direct transmittance of the object of interest, spherical albedo of the object of interest, or path radiance of the object of interest; and
raw information representing a digital number of the remote sensing image.

15. The device of claim 12, wherein the pre-trained algal estimation model includes:
a first layer including a convolutional layer receiving at least a portion of the remote sensing image;
a second layer including a convolutional layer receiving an output of the first layer and a pooling layer; and
a third layer including at least one fully connected layer receiving an output of the second layer.

16. The device of claim 15, wherein the pre-trained algal estimation model further includes:
a first sub-layer for adjusting a scale gradient of at least one of the first layer and the second layer; and
a second sub-layer for preventing overfitting of the pre-trained algal estimation model by randomly dropping out some nodes of the second layer.

17. The device of claim 12, wherein the selected size of the input window is determined based on at least one of spatial information of the object of interest, a non-linear feature of a distribution of the water quality variable, or a linear feature of a concentration.

18. The device of claim 12, wherein the pre-trained algal estimation model learns a spatial and spectral feature of the input window through a convolutional layer.

19. The device of claim 12, wherein the water quality variable includes at least one of the followings:
phycocyanin that is one of compounds contained in the algal; or
chlorophyll-a.

20. The device of claim 12, wherein the processor is further configured to:
generate a pigment map indicating a distribution and a concentration of the algal based on the water quality variable.

* * * * *